United States Patent [19]

Leathers et al.

[11] 4,059,680
[45] Nov. 22, 1977

[54] METHOD OF PREPARING FUMED $SiO_2$

[75] Inventors: Joel F. M. Leathers, Midland, Mich.; Donald W. Calvin, Zachary, La.

[73] Assignee: The Dow Chemical Company, Midland, Mich.

[21] Appl. No.: 724,683

[22] Filed: Sept. 20, 1976

Related U.S. Application Data

[62] Division of Ser. No. 660,294, Feb. 23, 1976, Pat. No. 4,008,130.

[51] Int. Cl.$^2$ .................. C01B 33/12; C01B 7/22
[52] U.S. Cl. .................... 423/337; 423/336; 423/483; 423/484
[58] Field of Search ............. 423/335, 337, 341, 483, 423/484, 336

[56] References Cited

U.S. PATENT DOCUMENTS 3,110,562   11/1963   Hinkle ............................. 423/337
3,326,634   6/1967   Porter et al. ........................ 423/484

Primary Examiner—Jack Cooper
Attorney, Agent, or Firm—Walter J. Lee

[57] ABSTRACT

Fluorosilicic acid solutions, which normally undergo decomposition when distilled, thereby creating unwanted forms of $SiO_2$, are rendered stable during distillation by providing in the fluorosilicic acid solution an amount of HF which is at least about 10 parts of HF per 36 parts of $H_2SiF_6$ and an amount of $H_2O$ which is at least about 54 parts of $H_2O$ per 36 parts of $H_2SiF_6$. The mixture is distilled to remove any excess $H_2O$ and excess HF that is present, without encountering formation of $SiO_2$, until an azeotropic solution containing about 36% $H_2SiF_6$, about 10% HF and about 54% $H_2O$ is reached. The ternary azeotrope, being of constant quality and concentration, is more suitable for use in various processes, such as processes for making fumed $SiO_2$, than $H_2SiF_6$ solutions which are not of constant quality or concentration.

4 Claims, No Drawings

METHOD OF PREPARING FUMED SiO₂

CROSS REFERENCE TO RELATED APPLICATION

This is a divisional of application Ser. No. 660,294, filed Feb. 23, 1976, now U.S. Pat. No. 4,008,130.

BACKGROUND OF THE INVENTION

There exist aqueous solutions of $H_2SiF_6$, such as waste streams from processing of ores or minerals that contain silicon and fluorine values, which would be useful in chemical processes, such as in preparing fumed $SiO_2$ and HF, if the $H_2SiF_6$ could be purified to a constant quality by distillation. Attempts to distill water or other low-boiling material from relatively weak solutions of $H_2SiF_6$, in order to concentrate or purify the $H_2SiF_6$, cause decomposition and create unwanted forms of $SiO_2$. Attempts to distill $H_2SiF_6$ away from higher boiling impurities, such as $H_3PO_4$ or $H_2SO_4$, also cause decomposition and create unwanted forms of $SiO_2$. The $SiO_2$ so formed has no significant commercial value, thus the commercial significance of $H_2SiF_6$ is substantially negated by the formation of relatively useless forms of grainy-type $SiO_2$. If the aqueous $H_2SiF_6$ can be converted to a relatively constant quality and concentration, it can be used in processes which form commercially significant products, such as being combusted to make fumed $SiO_2$ and HF. Fumed $SiO_2$ is a form of $SiO_2$ which has good commercial value.

There exists then, a need for converting aqueous solutions of $H_2SiF_6$, especially those solutions which are not of constant quality or concentration, to solutions which can be distilled to relatively constant quality and concentration without encountering the decomposition of $H_2SiF_6$ and without creating unwanted forms of $SiO_2$.

As further background to certain embodiments of the present invention, there are a number of references which teach the burning of silicon fluoride compounds, such as $SiF_4$ and $H_2SiF_6$, by injecting the silicon fluoride compounds into a combusted mixture of fuel and oxygen in order to prepare fumed $SiO_2$. The oxygen is generally supplied as air and, conveniently, the fuel may be hydrogen. The fuel also may be an easily combusted hydrocarbon such as an aliphatic hydrocarbon having from 1 to about 12 carbon atoms or mixtures of such hydrocarbons. Representative patents for such formation of fumed $SiO_2$ are, for example, U.S. Pat. Nos. 2,819,151; 3,203,759; 3,110,562 and others. It is highly desirable that the feed stream of $H_2SiF_6$ be of substantially constant quality and concentration in order that the process not be erratic, especially since such processes are normally expected to be performed continuously.

Throughout this disclosure, the "decomposition" which is avoided by the present invention is illustrated by:

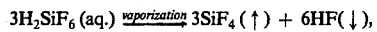

then in the distillation condenser:

It is an object of the present invention to provide an aqueous solution of $H_2SiF_6$ which is of substantially constant quality and concentration for use as feed material to chemical processes.

It is another to provide an aqueous solution of $H_2SiF_6$ which can be distilled without encountering decomposition and without creating unwanted forms of $SiO_2$.

It is still another object to provide an aqueous solution containing $H_2SiF_6$ of substantially constant quality and concentration for use in a high temperature combustion process in which fumed $SiO_2$ and HF are produced.

Another object is the removal of substantial amounts of water from weak solutions of $H_2SiF_6$ by distillation at elevated temperature to make a more concentrated solution without encountering decomposition and creation of grainy-type $SiO_2$.

These and other objects are obtained by the invention described and claimed herein.

SUMMARY OF THE INVENTION

It has now been found that the formation of unwanted $SiO_2$ which normally forms in the condenser when aqueous solutions containing $H_2SiF_6$ are distilled can be avoided by providing, for each 36 parts of $H_2SiF_6$, at least about 10 parts of HF and at least about 54 parts of $H_2O$ in the solution. Such a solution can be distilled, the low boiling components boiling off first (including excess water and/or HF or other "lights" such as HCl) and then the ternary azeotrope containing about 36% $H_2SiF_6$, about 10% HF, and about 54% water can be distilled away from the higher boiling impurities, such as $H_3PO_4$ or $H_2SO_4$ or other high boiling or non-volatile impurities.

The ternary azeotrope may then be used as feed for chemical processes which utilize $H_2SiF_6$, such as processes which burn the $H_2SiF_6$, by the combustion of fuel and oxygen to make fumed $SiO_2$ and HF. Fumed $SiO_2$ is a commercially desirable form of $SiO_2$.

Alternatively, the distillation process to obtain the desired azeotrope is operated in two distillation steps, either batchwise or continuously, by performing the first step in one distillation operation at reflux in which the volatiles and any excess $H_2O$ or HF are boiled off while transferring the heavies to a second distillation to boil the azeotrope away from any non-volatiles or higher boiling impurities that may be present.

Throughout this disclosure, all percents, ratios, and quantities are by weight.

DETAILED DESCRIPTION OF THE INVENTION

An aqueous solution of $H_2SiF_6$ is provided with sufficient HF and $H_2O$ to give a solution containing at least about 10 parts by weight of HF and at least about 54 parts by weight of $H_2O$ per 36 parts of $H_2SiF_6$. The aqueous mixture is then distilled to remove the low boiling components, including any excess HF and/or $H_2O$ that may be present. By the term "excess", it is meant that more water and/or more HF may be in the solution, prior to distillation, than is required to form the ternary azeotrope of about 36% $H_2SiF_6$, about 10% HF, and about 54% $H_2O$.

The ternary azeotrope boils at about 116° C, ± 2°, at ambient atmospheric pressure. The composition of the azeotrope is difficult to analyze exactly, due to lack of a really good analytical technique, therefore the concentrations are given as "about" and are representative of nominal amounts as determined from many samples. The analytical technique for measuring the compositions of the azeotrope is done by a method of cold and hot titrations with standard NaOH, using prescribed indicators, in accordance with the procedures described by W. W. Scott in "Standard Methods of Chemical Analysis," 5th edition, Vol. 11, p. 2209, New York, D. Van Nostrand Co. (1939), and by W. B. Sherry, et al. *Ind. Eng. Chem.,* Anal. Ed. 16, p. 483 (1944).

The aqueous solution of $H_2SiF_6$ with which one starts can be any solution containing significant quantities of $H_2SiF_6$. Solutions which contain more water than is needed to form the azeotrope are usable provided that enough HF is supplied. There is no problem with having more HF and/or water than is needed to form the azeotrope. The problem with not having enough HF is that the deficiency results, correspondingly, in the formation of unwanted forms of $SiO_2$ when the solution is distilled.

If the solution has enough (or more than enough) HF, but not enough water, some of the HF and $H_2SiF_6$ will boil off during distillation. Eventually, in this case, the concentration of $H_2SiF_6$ will decrease to the point at which the ratio of water to $H_2SiF_6$, and of HF to $H_2SiF_6$, is the proper ratio for the ternary azeotrope, but the $H_2SiF_6$ going overhead in the meantime is subject to decomposition, in this case yielding $HF + SiF_4$.

The following example demonstrates the present invention in comparison with an attempt to distill an aqueous solution of $H_2SiF_6$ which does not have the required minimum amount of HF to form the azeotrope.

EXAMPLE 1

An aqueous waste stream from a mineral processing plant, containing about 25% $H_2SiF_6$ and a small percent of heavies (mostly $H_2SO_4$ and $H_3PO_4$), is fed to a distillation column in an attempt to distill off water and form a more concentrated aqueous solution of $H_2SiF_6$. It is soon found that a grainy form of $SiO_2$ is being formed and is plugging the overhead condenser and lines and aqueous $H_2SiF_6$ is coming over. This is evidence that some of the $H_2SiF_6$ is undergoing decomposition to $SiF_4$ and HF, and the $SiF_4$ is reacting with water in the overhead to give $SiO_2$.

The same waste stream, with about 10% HF added to it, is fed to the distillation column. Excess water and HF distill over leaving an azeotrope containing about 36% $H_2SiF_6$, about 10% HF and about 54% water which boils at about 116° C. No decomposition of the $H_2SiF_6$ is found and no $SiOf_2$ is formed. The ternary azeotrope is then distilled from the higher boiling heavies and during the distillation of the azeotrope, no decomposition is found and formation of unwanted $SiO_2$ is avoided.

The azeotrope is fed into the flame in a combustion chamber where a mixture of hydrogen and air is burned. The hot gases from the combustion chamber are immediately passed through a solids separator where the fumed $SiO_2$ product is collected and removed. The HF and any other fluoride values present in the gases which have passed through the separator are cycled back to the aqueous waste stream for further use in an azeotropic mixture.

EXAMPLE 2

An aqueous solution of $H_2SiF_6$ with HF added to it is distilled as follows:

238 parts of solution containing about 8.3% HF, about 26.3% $H_2SiF_6$, and about 65.4% $H_2O$ are distilled in a distillation column equipped with an inner condenser to provide reflux.

After about 54 parts of overhead has been collected a sample is collected for analysis (Sample A).

After about 100 parts of overhead has been collected and as the pot temperature begins to line-out at about 116° C, ±2° the distillate is cut in order to begin collecting the ternary azeotrope and a sample of the first cut is taken for analysis (Sample B).

The next 35 parts of overhead, coming over at about 116° C, ±2°, is sampled for analysis (Sample C).

The remaining overhead fractions (coming over at about 116° C, ±2°) are combined with the 35 parts and a sample of the composite is sampled for analysis (Sample D). No $SiO_2$ is formed during distillation.

| | Analysis | | | |
|---|---|---|---|---|
| Sample | %HF | %$H_2SiF_6$ | %$H_2O$ | Remarks |
| A | 0.6 | 0 | 99.4 | excess $H_2O$ and HF coming over |
| B | 4.13 | 0.51 | 95.36 | as temp. reaches b.p. of azeotrope, some $H_2SiF_6$ comes over |
| C | 10 | 35 | 55 | azeotropic mixture |
| D | 10 | 35.2 | 54.8 | azeotropic mixture |

This example demonstrates that the excess $H_2O$ and HF boils off before the azeotropic mixture distills over, yet no $SiO_2$ forms in the overhead indicating decomposition of the $H_2SiF_6$.

We claim:

1. A method of preparing fumed $SiO_2$ and HF from the combustion of $H_2SiF_6$, said method comprising providing an aqueous $H_2SiF_6$ feed stream,
    embodying said aqueous $H_2SiF_6$ feed stream into a ternary azeotrope containing about 36% $H_2SiF_6$, about 10% HF, and about 54% $H_2O$, said embodying being done by providing the aqueous $H_2SiF_6$ with at least about 10 parts of HF and at least about 54 parts of $H_2O$ per 36 parts of $H_2SiF_6$ and then distilling the so formed solution to obtain the ternary azeotrope,
    feeding the ternary azeotrope into the combustion chamber of a burner in which a combustible mixture of fuel and oxygen is burned, thereby forming fumed $SiO_2$ and HF which leave the burner in the resulting hot, gaseous combustion product stream,
    and separating fumed $SiO_2$ from the said product stream.

2. The method of claim 1 in which the HF and other fluoride values present in the combustion product stream, from which fumed $SiO_2$ has been separated, are the aqueous $H_2SiF_6$ feed stream to cycled back form a part of the ternary azeotrope.

3. The method of claim 1 in which the fuel in the combustible mixture is principally hydrogen.

4. The method of claim 1 in which the oxygen in the combustible mixture is present as an ingredient of air.

* * * * *

UNITED STATES PATENT AND TRADEMARK OFFICE
CERTIFICATE OF CORRECTION

PATENT NO. : 4,059,680

DATED : November 22, 1977

INVENTOR(S) : Joel F. M. Leathers
Donald W. Calvin

It is certified that error appears in the above-identified patent and that said Letters Patent are hereby corrected as shown below:

Column 2, line 1, after the word "another", insert ---object---.

Column 3, line 50, delete "$SiOf_2$" and insert ---$SiO_2$---.

Column 4, Claim 2, delete line 4 and rewrite as follows:
   ---cycled back to the aqueous $H_2SiF_6$ feed stream to form a---.

Signed and Sealed this

Eighteenth Day of April 1978

[SEAL]

Attest:

RUTH C. MASON
Attesting Officer

LUTRELLE F. PARKER
Acting Commissioner of Patents and Trademarks